(12) United States Patent
Kubo et al.

(10) Patent No.: US 6,370,977 B1
(45) Date of Patent: Apr. 16, 2002

(54) CONSTANT-MESH TRANSMISSION FOR A VEHICLE

(75) Inventors: Katsuhiro Kubo; Tsugio Ikeda; Norikazu Maeda, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/480,652

(22) Filed: Jan. 11, 2000

(30) Foreign Application Priority Data

Jan. 11, 1999 (JP) .......................................... 11-004500

(51) Int. Cl.[7] .............................................. F16H 3/22
(52) U.S. Cl. ............................ 74/342; 74/344; 74/339
(58) Field of Search .......................... 74/339, 342, 343, 74/344, 345, 331, 333

(56) References Cited

U.S. PATENT DOCUMENTS

| | | | | |
|---|---|---|---|---|
| 4,116,084 A | * | 9/1978 | Masuda ........................ | 74/342 |
| 4,611,504 A | * | 9/1986 | Rundle ...................... | 74/342 X |
| 4,676,115 A | * | 6/1987 | Morscheck et al. ........... | 74/339 |
| 4,726,258 A | * | 2/1988 | Hayashi et al. ................ | 74/740 |
| 4,823,628 A | * | 4/1989 | Hiraiwa ..................... | 74/333 X |
| 4,869,353 A | * | 9/1989 | Ohtsuki et al. ........... | 74/339 X |
| 4,922,767 A | * | 5/1990 | Toshifumi ..................... | 74/333 |
| 5,640,882 A | * | 6/1997 | Mueller ..................... | 74/333 X |
| 5,715,727 A | * | 2/1998 | Janiszewski .............. | 74/331 X |
| 5,836,206 A | * | 11/1998 | Craft ........................... | 74/333 |

FOREIGN PATENT DOCUMENTS

JP    A10159973    6/1998

* cited by examiner

Primary Examiner—Charles A. Marmor
Assistant Examiner—Ha Ho
(74) Attorney, Agent, or Firm—Birch Stewart Kolasch & Birch, LLP

(57) ABSTRACT

A transmission for a vehicle including first and second rotating shafts which are rotatable by the torque transmitted through a clutch. Each shaft includes several transmission gears. A resisting member can be disposed between a gear and its corresponding shaft, such that the resisting member reduces the difference in rotating speed between the first and second shafts. The resisting member serves to reduce shift shock and noise generated during shifting. Additional resisting members can be placed on either the first or second shaft in order to achieve reduced shift shock and noise.

15 Claims, 8 Drawing Sheets

CONSTANT-MESH TRANSMISSION FOR A VEHICLE

BACKGROUND OF THE INVENTION

1. Field of the Invention

The present invention relates to a transmission for use in a power transmitting system for transmitting the power of an internal combustion engine mounted on a vehicle such as a motorcycle to a wheel of the vehicle. More particularly, the present invention is addressed to a constant-mesh transmission for a vehicle to which the rotation of a crankshaft of the internal combustion engine is transmitted through a clutch.

2. Background Art

A conventional constant-mesh transmission for use in a power transmitting system for transmitting the power of an internal combustion engine mounted on a motorcycle to a wheel of the motorcycle is described in Japanese Patent Laid-open No. 10-159973. Such a conventional constant-mesh transmission is shown in FIG. 9 of this application. Referring to FIG. 9, reference character a denotes a constant-mesh transmission, in which the rotation of a crankshaft 6 of an internal combustion engine is transmitted through a multiple-disc friction clutch c to a main shaft d as an output rotating shaft of the clutch c, and further transmitted through a plurality of constantly meshing transmission gears e and f to a counter shaft g. The rotation of the counter shaft g is transmitted to the wheel through a chain wrapped around a sprocket h fixed to one end of the counter shaft g.

In more detail, a transmission gear is mounted on one of the main shaft d and the counter shaft g so as to be non-rotatable relative thereto, and another transmission gear constantly meshing with the above relatively non-rotatable transmission gear is rotatably mounted on the other of the main shaft d and the counter shaft g. In shifting the transmission gears, a shifting mechanism n including a gear shift pedal (not shown), a gear shift arm i, shift pins j, a shift drum k, and gear shift forks m is operated to thereby axially move a shifter splined with the other shaft toward the rotatable transmission gear on the other shaft. As a result, a projection (referred to as "dowel") formed on the shifter comes into engagement with a recess or hole formed in the rotatable transmission gear on the other shaft, so that the rotatable transmission gear on the other shaft is integrated with the other shaft. Accordingly, the counter shaft g is rotated relative to the main shaft d at a speed determined by a gear ratio between the transmission gears.

In such a constant-mesh transmission, the rotating speed of the shifter is different from the rotating speed of the transmission gear to be engaged with the shifter, so that the engagement of these two members accompanies impact, causing a shift shock and an impact noise.

In starting the vehicle from a rest condition, the transmission is in a neutral position and the clutch is in an engaged condition, so that the main shaft is kept in rotation by the torque of the crankshaft and the counter shaft is not in rotation. To start the vehicle from this condition, the clutch is once disengaged and the shifting mechanism is operated to shift the transmission from the neutral position to a first-speed position. At this time, although the clutch is in the disengaged condition, the main shaft is kept in rotation by inertia. Accordingly, when the shifter comes into engagement with the transmission gear, a large shift shock and impact noise may occur because of a relatively large difference in rotating speed between the shifter and the transmission gear.

It is accordingly an object of the present invention to reduce a shift shock and an impact noise upon shifting in a constant-mesh transmission for a vehicle.

SUMMARY OF THE INVENTION

In accordance with the present invention, there is provided in a constant-mesh transmission for a vehicle including first and second rotating shafts rotatable by the torque transmitted through a clutch, a first transmission gear rotatably mounted on the first rotating shaft, and a second transmission gear constantly meshing with the first transmission gear and mounted on the second rotating shaft so as to be non-rotatable relative to the second rotating shaft. A resisting member is provided between a rotational portion of the first rotating shaft and the first transmission gear for imparting a rotation resisting force to the first rotating shaft or the first transmission gear.

With this configuration, when the transmission is in a neutral position, the first rotating shaft (or the second rotating shaft) is kept in rotation by the torque transmitted through the clutch in its engaged condition. The rotating speed of the first transmission gear (including its non-rotative condition) is different from that of the first rotating shaft, because the first transmission gear is rotatably mounted on the first rotating shaft and constantly meshes with the second transmission gear mounted on the second rotating shaft so as to be non-rotatable relative thereto.

When the clutch is disengaged to carry out gear shifting from the above condition, the first rotating shaft or the first transmission gear receives a rotation resisting force from the resisting member, because the first rotating shaft (or the second rotating shaft) keeps rotation by inertia and the resisting member is provided between the rotational portion of the first rotating shaft and the first transmission gear both rotating at different speeds. Accordingly, a difference in rotating speed between the first rotating shaft and the second rotating shaft rotating integrally with the first transmission gear through the second transmission gear can be reduced. As a result, the impact upon engagement of the shifter and the transmission gear can be reduced to thereby reduce a shift shock and an impact noise.

In starting the vehicle from a rest condition, the first rotating shaft is kept in rotation by the torque of the crankshaft through the clutch, and the second rotating shaft is not in rotation, for example. When the clutch is disengaged in this condition, the first rotating shaft receives a rotation resisting force from the resisting member provided between the rotational portion of the first rotating shaft and the first transmission gear not rotating, so that the rotating speed of the first rotating shaft is reduced. As a result, the impact upon engagement of the shifter and the transmission gear can be reduced to thereby reduce a shift shock and an impact noise.

The second transmission gear is mounted on the second rotating shaft so as to be slidable in the axial direction of the second rotating shaft and to be non-rotatable relative to the second rotating shaft, and thereby serves also as a shifter. With this configuration, the number of parts can be reduced and the transmission can be made compact.

The resisting member is an annular member comprising a metal ring and a lip, the metal ring being fixed to the rotational portion of the first rotating shaft or to the first transmission gear. With this configuration, the resisting member can be firmly fixed through its metal ring, and a larger rotation resisting force can be imparted by utilizing a force generated by deformation of the lip.

The resisting member may be accommodated in a recess formed on the inner circumference of the first transmission gear. With this configuration, the resisting member can be accommodated in the recessed space formed on the first transmission gear, so that the resisting member can be compactly accommodated and the transmission can accordingly be made compact.

The resisting member may also be press-fitted with the outer circumference of the rotational portion of the first rotating shaft. With this configuration, structural modification of the transmission can be minimized, and the number of parts can be reduced. Further, the structure can be simplified and the resisting member can be easily mounted.

The resisting member can impart the rotation resisting force to the outer circumference of the rotational portion of the first rotating shaft in an area for mounting the first transmission gear or to the inner circumference of the first transmission gear. With this configuration, the resisting member can be mounted within the mounting area of the first transmission gear on the rotational portion of the first rotating shaft, thereby allowing compact arrangement of the resisting member.

Incidentally, the wording of "rotational portion of a rotating shaft" used in this specification means a rotational portion of the rotating shaft itself or a rotational portion of a member mounted on the rotating shaft so as to be non-rotatable relative thereto and accordingly rotating integrally with the rotating shaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
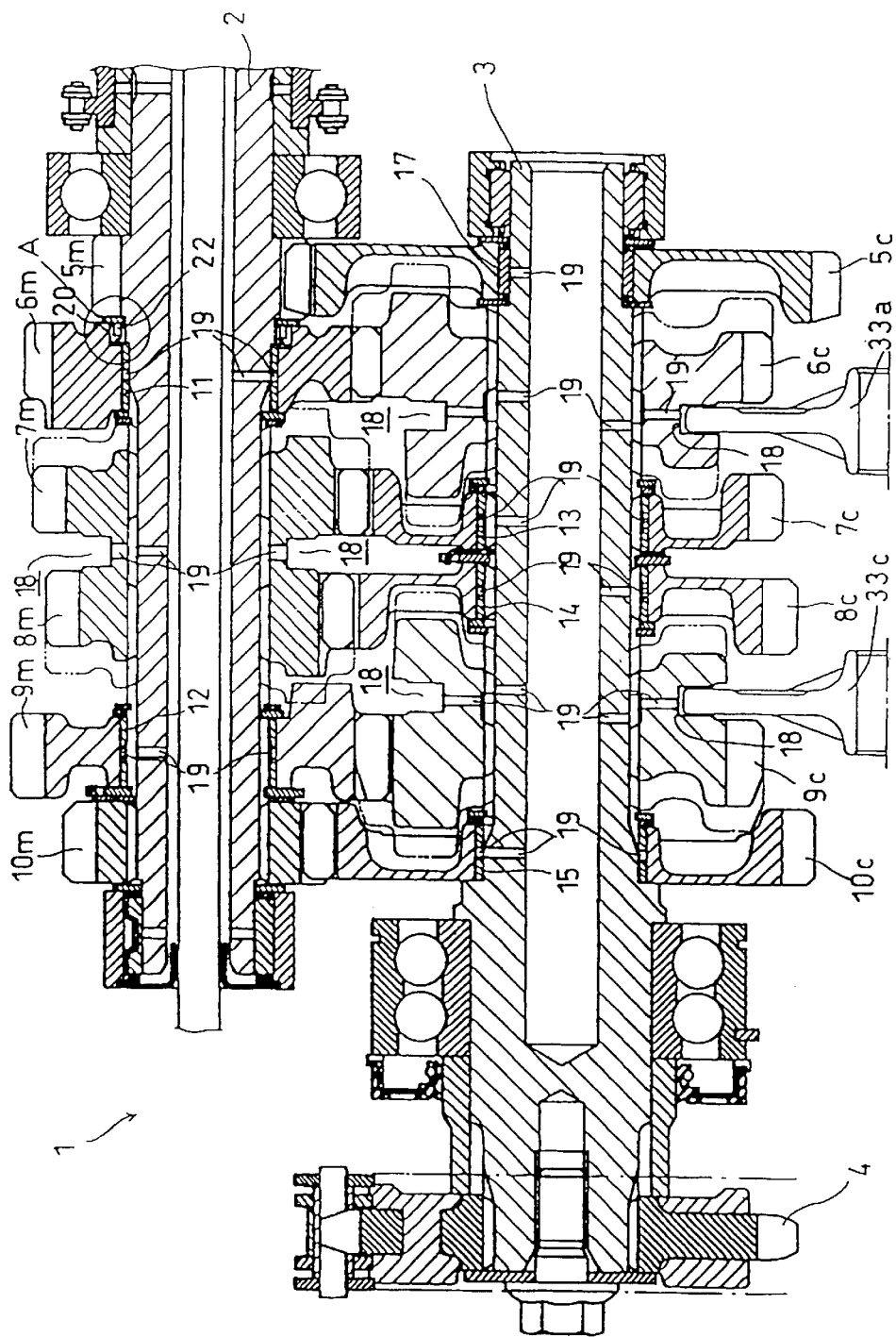
FIG. 1 is a sectional view of a constant-mesh transmission for a vehicle according to a first preferred embodiment of the present invention.

FIG. 1 shows a constant-mesh transmission 1 for a vehicle according to a first preferred embodiment of the present invention. The transmission 1 includes a main shaft 2 and a counter shaft 3, and it is mounted on an overhead valve type two-cylinder internal combustion engine mounted on a motorcycle. A multiple-disc friction clutch (not shown) is mounted on a right portion of the main shaft 2 as viewed in FIG. 1, so that rotation of a crankshaft of the internal combustion engine is transmitted through the multiple-disc friction clutch to the main shaft 2 and the counter shaft 3 as rotating shafts. A drive sprocket 4 is fixed to one end of the counter shaft 3, and a driven sprocket is fixed to the axle of a rear wheel as a drive wheel of the motorcycle. A chain is wrapped between the drive sprocket 4 and the driven sprocket to thereby transmit rotation of the counter shaft 3 to the rear wheel.

The main shaft 2 and the counter shaft 3 are rotatably supported through bearings to a crankcase 35. Mounted on the main shaft 2 are a first gear 5m, fifth gear 6m, fourth gear 7m, third gear 8m, sixth gear 9m, and second gear 10m as transmission gears on the main shaft 2. These gears 5m, 6m, 7m, 8m, 9m, and 10m are arranged in this order from the side of the multiple-disc friction clutch. Mounted on the counter shaft 3 are a first gear 5c, fifth gear 6c, fourth gear 7c, third gear 8c, sixth gear 9c, and second gear 10c as transmission gears on the counter shaft 3 respectively corresponding to the transmission gears 5m, 6m, 7m, 8m, 9m, and 10m on the main shaft 2. These gears 5c, 6c, 7c, 8c, 9c, and 10c are in constant mesh with the gears 5m, 6m, 7m, 8m, and 10m, respectively.

The mounted condition of the transmission gears on the main shaft 2 will now be described. The first gear 5m is a gear formed integral with the main shaft 2. The fifth gear 6m is rotatably mounted through an annular bushing 11 fitted with the outer circumference of the main shaft 2. The fourth gear 7m and the third gear 8m are formed integral with each other, and spline ridges formed on the inner circumferences of the gears 7m and 8m are engaged with spline grooves formed on the outer circumference of the main shaft 2 so as to extend parallel to the axis of the main shaft 2. Thus, the fourth gear 7m and the third gear 8m are mounted on the main shaft 2 so as to be slidable in the axial direction of the main shaft 2 and to be non-rotatable relative to the main shaft 2.

The fourth gear 7m and the fifth gear 6m are opposed to each other side by side. One side surface of the fourth gear 7m opposed to the fifth gear 6m is formed with a projection, and one side surface of the fifth gear 6m opposed to the fourth gear 7m is formed with a projection. The projection of the fourth gear 7m is adapted to engage the projection of the fifth gear 6m. Similarly, the third gear 8m and the sixth gear 9m are opposed to each other side by side. One side surface of the third gear 8m opposed to the sixth gear 9m is formed with a projection, and one side surface of the sixth gear 9m opposed to the third gear 8m is formed with a projection. The projection of the third gear 8m is adapted to engage the projection of the sixth gear 9m. Accordingly, the fourth and third gears 7m and 8m formed integral with each other serve also as a shifter.

The sixth gear 9m is rotatably mounted through an annular bushing 12 fitted with the outer circumference of the main shaft 2. Spline ridges formed on the inner circumference of the second gear 10m are engaged with the spline grooves formed on the outer circumference of the main shaft 2, so that the second gear 10m is mounted on the main shaft 2 so as to be non-rotatable relative to the main shaft 2. Movement of the fifth gear 6m, the sixth gear 9m, and the second gear 10m in the axial direction of the main shaft 2 is prevented by snap rings.

The mounted condition of the transmission gears on the counter shaft 3 is as follows: The first gear 5c is rotatably mounted through a rolling bearing 17 on the counter shaft 3. Spline ridges formed on the inner circumference of the fifth gear 6c are engaged with spline grooves formed on the outer circumference of the counter shaft 3 so as to extend parallel to the axis of the counter shaft 3, so that the fifth gear 6c is mounted on the counter shaft 3 so as to be slidable in the axial direction of the counter shaft 3 and to be non-rotatable relative to the counter shaft 3.

The fifth gear 6c and the first gear 5c are opposed to each other side by side. One side surface of the fifth gear 6c opposed to the first gear 5c is formed with a first projection, and one side surface of the first gear 5c opposed to the fifth gear 6c is formed with a recess.

The first projection of the fifth gear 6c is adapted to engage the recess of the first gear 5c. Similarly, the fifth gear 6c is also opposed to the fourth gear 7c side by side. The other side surface of the fifth gear 6c opposed to the fourth gear 7c is formed with a second projection, and one side surface of the fourth gear 7c opposed to the fifth gear 6c is formed with a recess. The second projection of the fifth gear 6c is adapted to engage the recess of the fourth gear 7c. Accordingly, the fifth gear 6c serves also as a shifter.

The fourth gear 7c and the third gear 8c are rotatably mounted through annular bushings 13 and 14 on the counter shaft 3, respectively. Each of the annular bushings 13 and 14 has internal spline ridges engaged with the spline grooves formed on the outer circumference of the counter shaft 3.

The sixth gear 9c has internal spline ridges engaged with the spline grooves formed on the outer circumference of the counter shaft 3, so that the sixth gear 9c is mounted on the counter shaft 3 so as to be slidable in the axial direction of the counter shaft 3 and to be non-rotatable relative to the counter shaft 3.

The sixth gear 9c is opposed to the third gear 8c side by side. One side surface of the sixth gear 9c opposed to the third gear 8c is formed with a first projection, and one side surface of the third gear 8c opposed to the sixth gear 9c is formed with a recess. The first projection of the sixth gear 9c is adapted to engage the recess of the third gear 8c. The sixth gear 9c is also opposed to the second gear 10c side by side. The other side surface of the sixth gear 9c opposed to the second gear 10c is formed with a second projection, and one side surface of the second gear 10c opposed to the sixth gear 9c is formed with a recess. The second projection of the sixth gear 9c is adapted to engage the recess of the second gear 10c. Accordingly, the sixth gear 9c serves also as a shifter.

The second gear 10c is rotatably mounted through an annular bushing 15 fitted with the outer circumference of the counter shaft 3. Movement of the first gear 5c, the fourth gear 7c, and the third gear 8c in the axial direction of the counter shaft 3 is prevented by snap rings, and movement of the second gear 10c in the axial direction of the counter shaft 3 is prevented by a snap ring and a side wall of a shoulder formed on the counter shaft 3.

The outer circumferences of the integral fourth and third gears 7m and 8m on the main shaft 2, the fifth gear 6c on the counter shaft 3, and the sixth gear 9c on the counter shaft 3 each serving as a shifter are formed with three annular grooves 18. Three shift forks 33a, 33b, and 33c are engaged with the three annular grooves 18, respectively. The shift forks 33a, 33b, and 33c are engaged with three cam grooves 32 formed on a shift drum 31 of a shifting mechanism 30 to be hereinafter described, and are movable in the axial directions of the main shaft 2 and the counter shaft 3.

By moving the shift forks 33a, 33b, and 33c, one of the projections of the fourth and third gears 7m and 8m on the main shaft 2 comes into engagement with the projection of the fifth gear 6m on the main shaft 2 or the projection of the sixth gear 9m on the main shaft 2. The first or second projection of the fifth gear 6c on the counter shaft 3 comes into engagement with the recess of the first gear 5c on the counter shaft 3 or the recess of the fourth gear 7c on the counter shaft 3, and the first or second projection of the sixth gear 9c on the counter shaft 3 comes into engagement with the recess of the third gear 8c on the counter shaft 3 or the recess of the second gear 10c on the counter shaft 3.

The shafts 2 and 3, the bushings 11, 12, 13, 14, and 15, the bearing 17, and the transmission gears 7m, 8m, 6c, and 9c as shifters are formed with oil passages 19 for supplying oil between the bushing 11 and the gear 6m engaging with the bushing 11, between the bushing 12 and the gear 9m engaging with the bushing 12, between the bushing 13 and the gear 7c engaging with the bushing 13, between the bushing 14 and the gear 8c engaging with the bushing 14, between the bushing 15 and the gear 10c engaging with the bushing 15, and between the bearing 17 and the gear 5c engaging with the bearing 17, thereby allowing smooth rotation of the gears 6m, 9m, 7c, 8c, 10c, and 5c relative to the bushings 11, 12, 13, 14, and 15, and the bearing 17, respectively. Further, the oil from the oil passages 19 is also supplied to the annular grooves 18 of the gears 7m, 8m, 6c, and 9c as shifters, thereby allowing smooth rotation of the gears 7m, 8m, 6c, and 9c relative to the shift forks 33a, 33b, and 33c.

In the above arrangement of the main shaft 2, the counter shaft 3, and the transmission gears, the inner circumference of the fifth gear 6m rotatably mounted on the main shaft 2 is recessed at its one axial end facing the first gear 5m to form an annular shoulder 20. That is, an annular space is defined between the annular shoulder 20 and the outer circumference of the main shaft 2, and a resisting member 22 is accommodated in this annular space.

Figure 2:
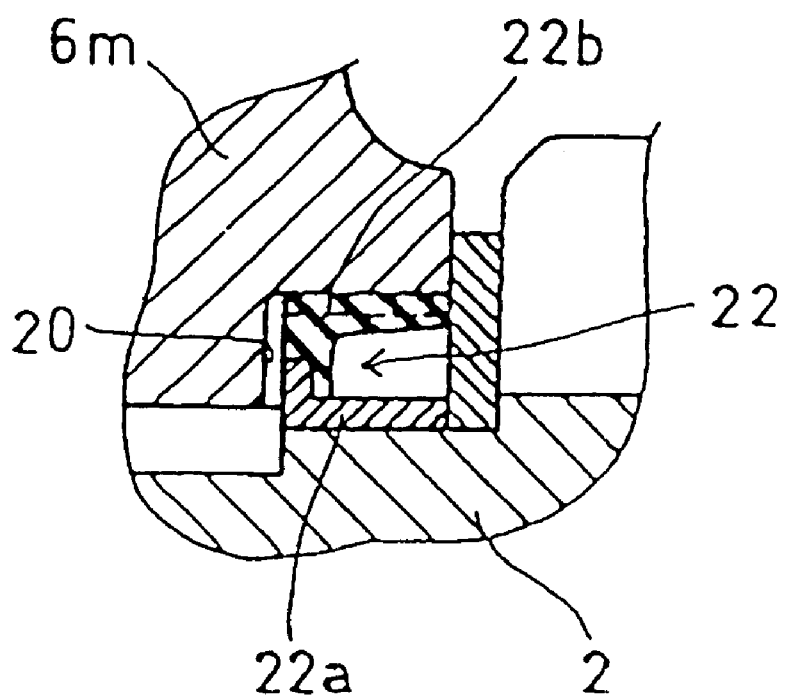
FIG. 2 is an enlarged view of a portion A shown in FIG. 1.

As shown in FIG. 2, the resisting member 22 is composed of a metal ring 22a and an annular lip 22b fixed to the outer circumference of the metal ring 22a. The annular lip 22b is formed of an elastic material such as rubber or plastic. The metal ring 22a is composed of a cylindrical portion and a flange portion extending radially outwardly from an end of the cylindrical portion. The metal ring 22a is fixed to the outer circumference of the main shaft 2 by press fit. The lip 22b is fixed to the flange portion and a part of the cylindrical portion of the metal ring 22a in such a manner that a radial gap is defined between the lip 22b and the remaining part of the cylindrical portion of the metal ring 22a.

The outer circumference of the lip 22b kept in contact with the inner circumference of the shoulder of the fifth gear 6m is formed with many grooves extending parallel to the axis of the main shaft 2, so as to ensure a large coefficient of friction. There is generated a frictional force, or rotation resisting force based on an elastic force by compressive deformation of a portion of the lip 22b present between the outer circumference of the flange portion of the metal ring 22a and the inner circumference of the shoulder 20 of the fifth gear 6m. There is further generated a frictional force, or rotation resisting force based on an elastic force by depressive deformation of a portion of the lip 22b spaced from the cylindrical portion of the metal ring 22a, which depressive deformation is due to radially inward depression by the fifth gear 6m.

Figure 3:
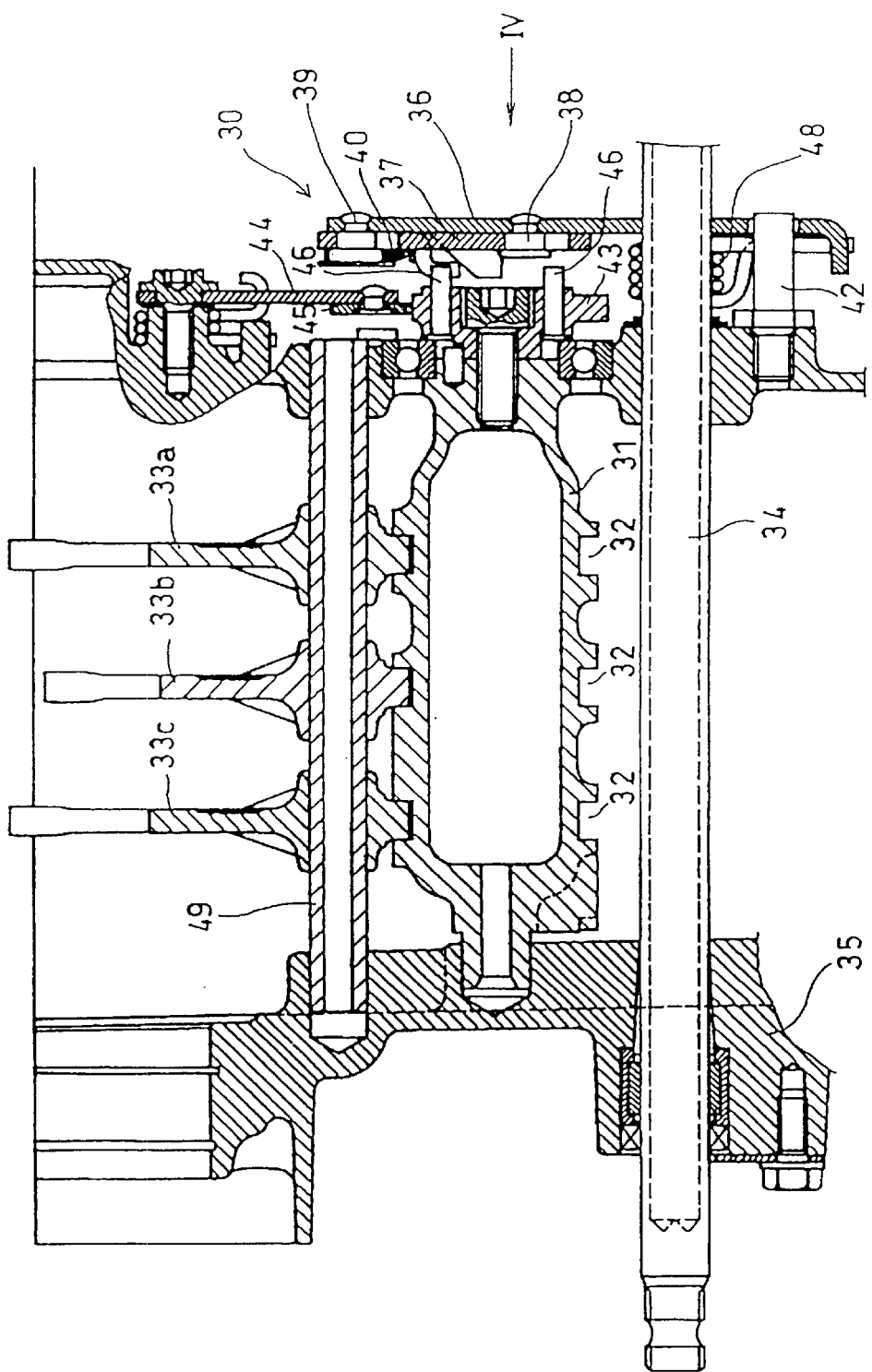
FIG. 3 is a sectional view of a shifting mechanism for the constant-mesh transmission shown in FIG. 1.

The shifting mechanism 30 will now be described with reference to FIGS. 3 to 6. As shown in FIG. 3, a gear shift spindle 34 is rotatably supported to a crankcase 35 in the condition where the opposite ends of the gear shift spindle 34 project from the crankcase 35. A gear shift pedal (not shown) is integrally fixed to the left end of the gear shift spindle 34 as viewed in FIG. 3, and a shifting master arm 36 is integrally fixed to the right end of the gear shift spindle 34 as viewed in FIG. 2. The gear shift spindle 34 is rotated clockwise or counterclockwise by depressing the gear shift pedal.

Figure 5:
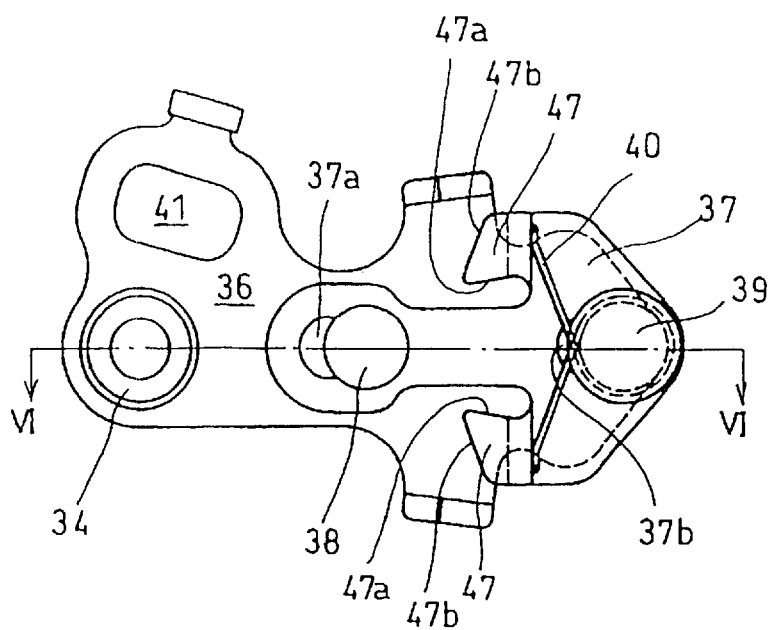
FIG. 5 is an end view of an assembled shifting master arm and gear shift arm.
Figure 6:
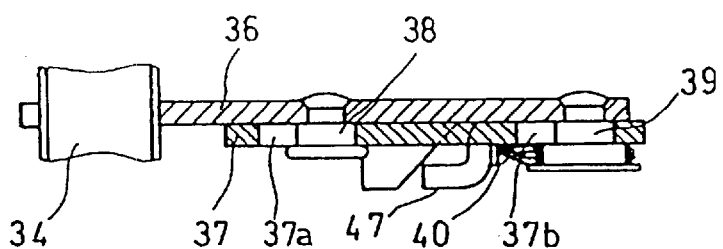
FIG. 6 is a cross section taken along the line VI—VI in FIG. 5.

As shown in FIGS. 5 and 6, a gear shift arm 37 having two elongated holes 37a and 37b is slidably mounted on the shifting master arm 36 in such a manner that two guide pins 38 and 39 each having a circular cross section are respectively inserted through the elongated holes 37a and 37b and fixed to the shifting master arm 36. Accordingly, the gear shift arm 37 is allowed to reciprocate relative to the shifting master arm 36 within a gap defined between the elongated hole 37a or 37b and the guide pin 38 or 39. Further, the gear shift arm 37 is normally biased toward the gear shift spindle 34 (to the left as viewed in FIG. 5) relative to the shifting master arm 36 by a biasing force of a shift arm spring 40 mounted on the guide pin 39 located farther from the gear shift spindle 34 than the guide pin 38. Reference numeral 41 denotes an opening for insertion of a pin 42 for restricting a swing range of the shifting master arm 36.

Figure 4:
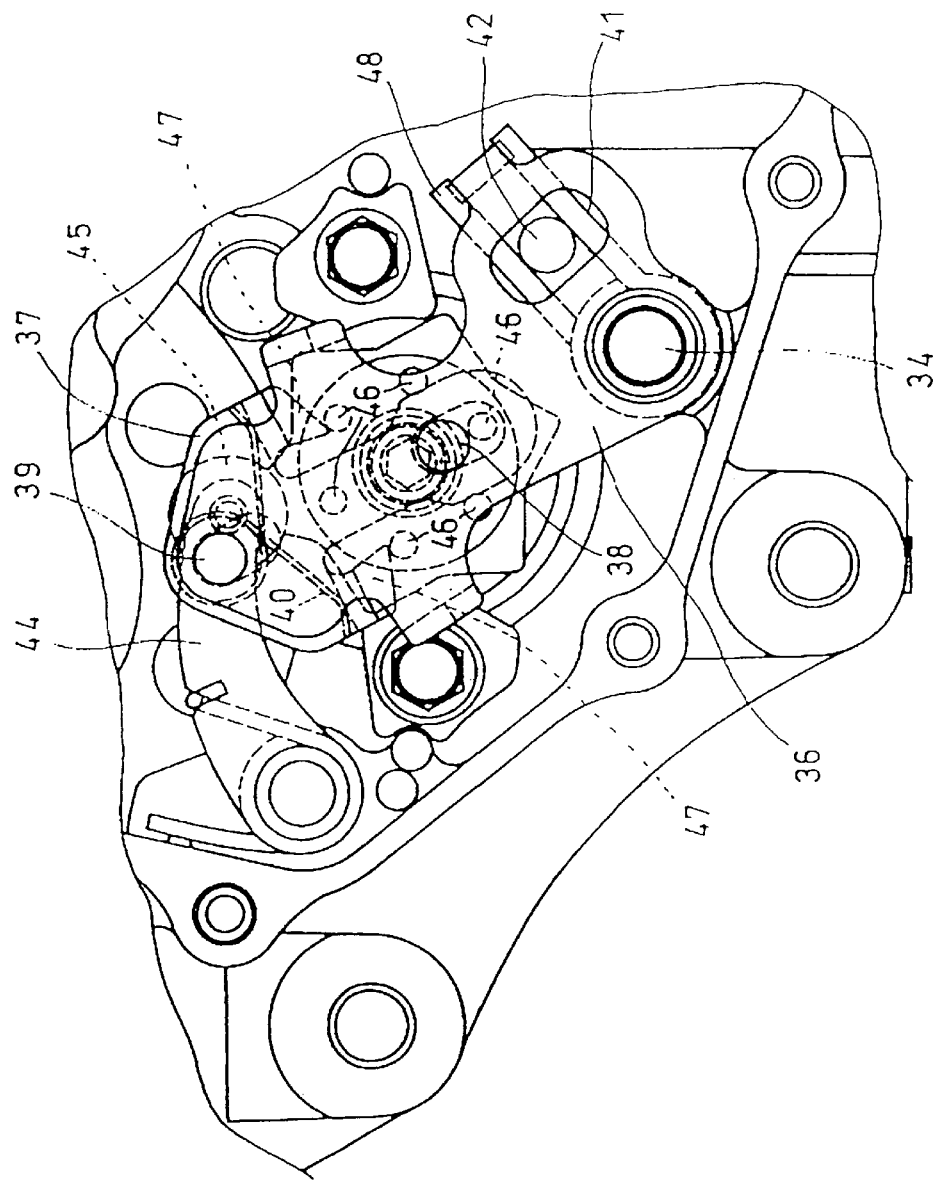
FIG. 4 is a view taken in the direction shown by an arrow IV in FIG. 3.

As shown in FIGS. 3 and 4, the shift drum 31 is rotatably supported to the crankcase 35, and a stopper plate 43 is integrally fixed to the right end of the shift drum 31. The outer periphery of the stopper plate 43 is formed with recesses corresponding to a neutral position and first-speed to sixth-speed positions in the transmission 1, and a roller 45 rotatably mounted at the front end of a stopper arm 44 biased by a spring is engaged with one of the recesses of the stopper plate 43, thereby retaining a rotational position of the shift drum 31 at one of the neutral position and the first-speed to sixth-speed positions.

Six shift pins 46 project from the stopper plate 43 toward the gear shift arm 37 and are arranged on a circle about the axis of the shift drum 31 at substantially equal intervals (see FIG. 4). When the shifting master arm 36 is swung according to the clockwise or counterclockwise rotation of the gear shift spindle 34, an inner surface 47a of one of two pawls 47 cut and bent from the gear shift arm 37 comes into engagement with one of the shift pins 46, thereby rotating the shift drum 31 to a position where the roller 45 of the stopper arm 44 comes into engagement with the adjacent recess of the stopper plate 43.

When a depression force applied to the gear shift pedal is released, the shifting master arm 36 is returned to its original position by a biasing force of a return spring 48. During the first stage of returning of the shifting master arm 36, an outer surface 47b of the pawl 47 comes into abutment against the shift pin 46, and the gear shift arm 37 slides away from the gear shift spindle 34 against the biasing force of the shift arm spring 40. During the subsequent stage of returning of the shifting master arm 36, the outer surface 47b of the pawl 47 is separated from the shift pin 46, so that the gear shift arm 37 is slid by the biasing force of the shift arm spring 40 to restore an original position with respect to the shifting master arm 36, and the shifting master arm 36 also finally restores its original position.

In this manner, the gear shift arm 37 slides on the sliding master arm 36 in the shift operation. Accordingly, there is a possibility that the gear shift arm 37 may not smoothly slide because of friction between the two arms 36 and 37, thus inhibiting smooth shifting. To cope with this problem, surface treatment for reducing a coefficient of friction is applied to at least one of the sliding surfaces of the shifting master arm 36 and the gear shift arm 37 according to the preferred embodiment. It is sufficient that this surface treatment be applied to at least the sliding surface of the shifting master arm 36 or the gear shift arm 37. Accordingly, this surface treatment may be applied to an area wider than the sliding surface, or may be applied to a part or the whole of the surface of each arm. As the surface treatment, electroless nickel plating or polyfluoroethylene lining may be adopted. By the surface treatment, reciprocation of the gear shift arm 37 on the shifting master arm 36 can be smoothly carried out to thereby effect smooth shifting, resulting in good shift feeling.

The shift forks 33a and 33c respectively engaged with the annular groove 18 of the fifth gear 6c on the counter shaft 3 and the annular groove 18 of the sixth gear 9c on the counter shaft 3 and the shift fork 33b engaged with the annular groove 18 of the integral fourth and third gears 7m and 8m on the main shaft 2 are axially movably and rotatably supported to a shift fork shaft 49. One of the shift forks 33a, 33b, and 33c is axially moved on the shift fork shaft 49 according to the shape of the corresponding cam groove 32 formed on the outer circumference of the shift drum 31. As a result, the shifter in the transmission 1 corresponding to the selected shift fork 33a, 33b, or 33c is axially moved on the main shaft 2 or the counter shaft 3 to thereby effect shifting.

The operation of the above preferred embodiment will now be described. When the vehicle is at rest in the condition where the transmission 1 is in the neutral position and the internal combustion engine is running with the clutch engaged, the main shaft 2 of the transmission 1 is in rotation by the torque of the crankshaft of the internal combustion engine transmitted through the clutch. On the other hand, the counter shaft 3 of the transmission 1 is not in rotation because the drive wheel of the vehicle is at rest.

In this condition, the first gear 5c, the second gear 10c, the third gear 8c, and the fourth gear 7m respectively meshing with the first gear 5m, the second gear 10m, the third gear 8m, and the fourth gear 7m rotating integrally with the main shaft 2 are rotated relative to the counter shaft 3 not rotating. The fifth gear 6m and the sixth gear 9m each rotatable relative to the rotating main shaft 2 respectively mesh with the fifth gear 6c and the sixth gear 9c each non-rotatable relative to the counter shaft 3, so that the fifth gear 6m and the sixth gear 9m on the main shaft 2 are at rest. Further, a frictional force, or rotation resisting force is applied from the fifth gear 6m to the main shaft 2 by the resisting member 22 located between the fifth gear 6m and the main shaft 2.

Shifting from the neutral position of the transmission 1 to the first-speed position will now be described. When the clutch is disengaged, the torque of the crankshaft is not transmitted to the main shaft 2. The rotation resisting force by the resisting member 22 kept in contact with the fifth gear 6m not rotating is applied to the main shaft 2. Accordingly, although the main shaft 2 is in rotation by inertia, the rotating speed of the main shaft 2 is reduced, and the rotating speed of the first gear 5c meshing with the first gear 5m is also reduced.

In this condition, the gear shift pedal is depressed to rotate the gear shift spindle 34. Accordingly, the shifting master arm 36 and the gear shift arm 37 are rotated to engage the pawl 47 of the gear shift arm 37 with the shift pin 46 and rotate the shift arm 31. By the rotation of the shift drum 31, the shift fork 33a engaged with the annular groove 18 of the fifth gear 6c is guided by the corresponding cam groove 32 of the shift drum 31 to move rightward on the shift fork shaft 49 as viewed in FIG. 1. At the same time, the fifth gear 6c not rotating is moved rightward on the counter shaft 3 as viewed in FIG. 1 by the movement of the shift fork 33a, so that the first projection of the fifth gear 6c not rotating comes into engagement with the recess of the first gear 5c rotating to thereby rotate the counter shaft 3 not rotating at a first-speed ratio and simultaneously rotate the drive wheel. Upon engagement of the fifth gear 6c and the first gear 5c, an impact force due to this engagement can be reduced because of a reduction in the rotating speed of the first gear 5m by the rotation resisting force of the resisting member 22. Accordingly, a shift shock and an impact noise due to the impact caused by this engagement can be reduced.

When a depression force applied to the gear shift pedal is released, the gear shift arm 37 can smoothly slide on the shifting master arm 36, because the sliding surface of at least one of the gear shift arm 37 and the shifting master arm 36 is surface-treated to reduce a coefficient of friction therebetween, thereby effecting smooth shifting.

When the clutch is disengaged in subsequent shifting, a difference in rotating speed between the main shaft 2 and the counter shaft 3 rotating integrally with the fifth gear 6c meshing with the fifth gear 6m can be reduced by the rotation resisting force by the resisting member 22 located between the main shaft 2 and the fifth gear 6m rotating at different speeds. Accordingly, a shift shock and an impact noise upon engagement of each shifter and the corresponding transmission gear can be reduced.

According to the above preferred embodiment, the following effects can be exhibited:

When the transmission 1 is in the neutral position, the main shaft 2 is kept in rotation by the torque of the crankshaft transmitted through the clutch engaged. The fifth gear 6m on the main shaft 2 is in mesh with the fifth gear 6c on the counter shaft 3, and therefore rotates at a speed different from the rotating speed of the main shaft 2. When the clutch is disengaged in this condition, the main shaft 2 is kept in rotation by inertia, but receives a rotation resisting force from the resisting member 22 located between the main shaft 2 and the fifth gear 6m. Accordingly, a difference in rotating speed between the main shaft 2 and the counter shaft 3 is reduced. As a result, impact upon engagement of each shifter and the corresponding transmission gear can be reduced, thereby reducing a shift shock and an impact noise.

Particularly in shifting the transmission 1 from the neutral position to the first-speed position to start running the vehicle from its rest condition, the rotating speed of the main shaft 2 is reduced by a relatively large rotation resisting force applied from the resisting member 22 to the main shaft 2, because the counter shaft 3 is not rotated. As a result, the shock upon engagement of the shifter (corresponding to the fifth gear 6c on the counter shaft 3) and the corresponding transmission gear (corresponding to the first gear 5c on the counter shaft 3) can be reduced, thereby reducing a shift shock and an impact noise.

The fourth and third gears 7m and 8m on the main shaft 2, the fifth gear 6c, and the sixth gear 9c on the counter shaft 3 serve as shifters. Accordingly, the number of parts can be reduced and the transmission 1 can be made compact.

The resisting member 22 can be firmly fixed to the main shaft 2 by the metal ring 22a, and a relatively large rotation resisting force can be applied to the fifth gear 6m on the main shaft 2 by utilizing an elastic force generated by deformation of the lip 22b.

The resisting member 22 is accommodated in a recess defined by the shoulder 20 recessed on the inner circumference of the fifth gear 6m on the main shaft 2. Accordingly, the resisting member 22 can be compactly accommodated, so that the transmission 1 can be made compact.

The resisting member 22 is press-fitted with the outer circumference of the main shaft 2. Accordingly, structural modification of the transmission 1 can be minimized. Further, the number of parts of the resisting member 22 is small and its structure is simple, thereby facilitating the mounting of the resisting member.

The resisting member 22 imparts a rotation resisting force to the outer circumference of the main shaft 2 at a portion for mounting the fifth gear 6m or to the inner circumference of the fifth gear 6m. Accordingly, the resisting member 22 can be accommodated within a range of mounting the fifth gear 6m to the main shaft 2, thereby allowing compact arrangement of the resisting member 22.

At least one of the sliding surfaces of the sliding master arm 36 and the gear shift arm 37 is surface-treated to reduce a coefficient of friction. Accordingly, wearing of parts due to friction between the two arms 36 and 37 can be reduced, and the sliding of the gear shift arm 37 on the shifting master arm 36 can be smoothened to thereby smoothen the shifting operation and improve a shift feeling.

Figure 7:
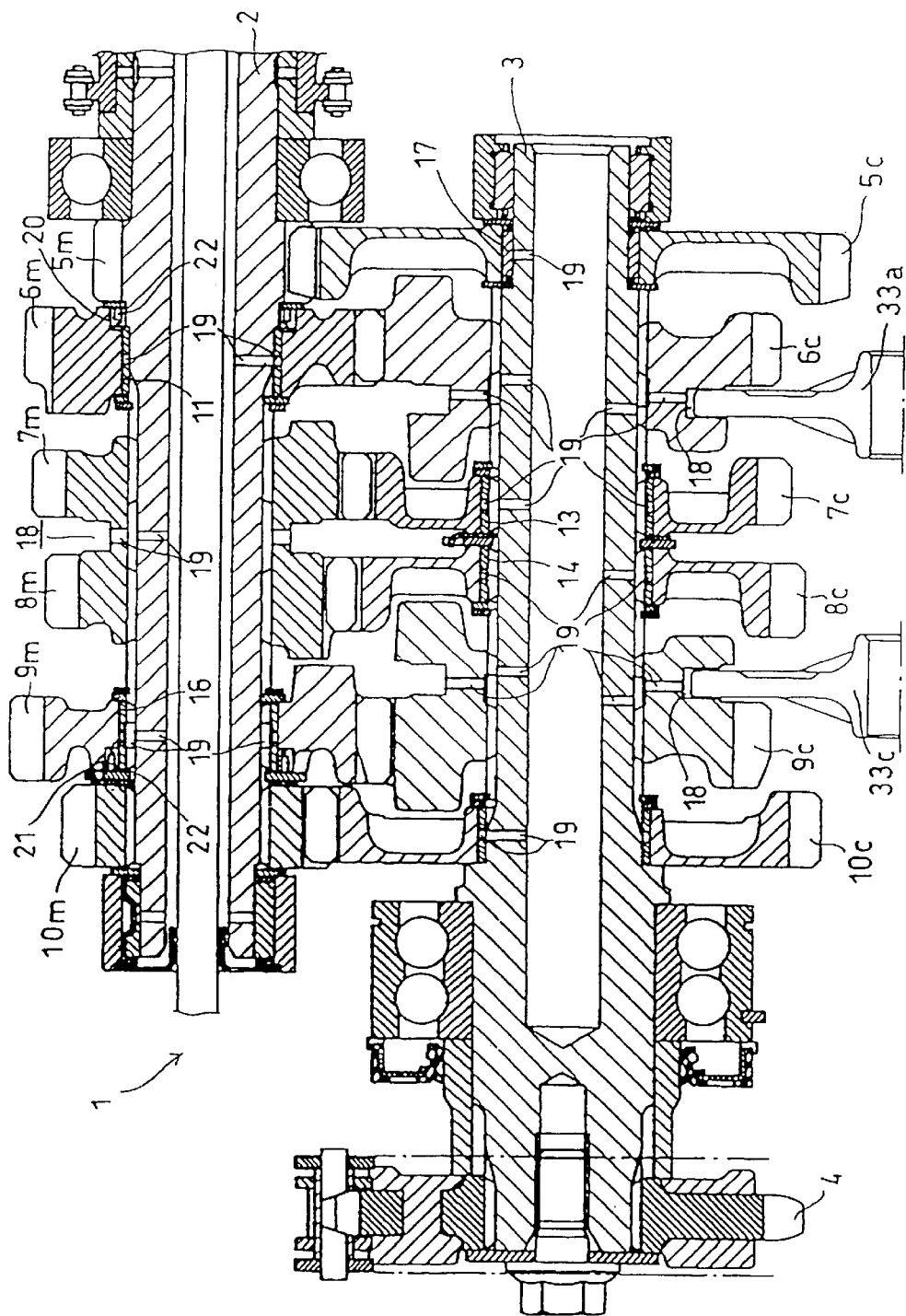
FIG. 7 is a sectional view of a constant-mesh transmission for a vehicle according to a second preferred embodiment of the present invention.

A second preferred embodiment of the present invention will now be described with reference to FIG. 7. In FIG. 7, parts like or corresponding to the parts shown in FIG. 1 are denoted by like reference numerals.

In the transmission 1 shown in FIG. 7, the sixth gear 9m is rotatably mounted on the main shaft 2 through an annular bushing 16. The inner circumference of the annular bushing 16 is formed with spline ridges engaging with the spline grooves formed on the outer circumference of the main shaft 2 so as to extend parallel to the axis of the main shaft 2. Further, the inner circumference of the sixth gear 9m is recessed at one axial end facing the second gear 10m to form an annular shoulder 21. An additional resisting member 22 is provided between the shoulder 21 of the sixth gear 9m and the bushing 16. This additional resisting member 22 is similar to the resisting member 22 provided between the fifth gear 6m and the main shaft 2. The metal ring 22a of the additional resisting member 22 is press-fitted with the outer circumference of the bushing 16. The rotation resisting force to be applied to the main shaft 2 by each resisting member 22 in the second preferred embodiment may be set equal to or different from the rotation resisting force in the first preferred embodiment. The other configuration of the second preferred embodiment is the same as that of the first preferred embodiment.

With the configuration of the second preferred embodiment mentioned above, the rotation resisting force applied to the main shaft 2 upon disengagement of the clutch can be made larger than that in the first preferred embodiment, because the two resisting members 22 are provided. Accordingly, the rotating speed of the main shaft 2 can be reduced at a ratio larger than that in the first preferred embodiment.

Alternatively, the rotation resisting force of each resisting member 22 may be set smaller than the rotation resisting force of the resisting member 22 in the first preferred embodiment so that the sum of the rotation resisting forces of the two resisting members 22 may become larger than the rotation resisting force of the single resisting member 22 in the first preferred embodiment. Accordingly, wearing of each resisting member 22 can be reduced, and a larger rotation resisting force can be applied to the main shaft 2.

According to the second preferred embodiment, effects similar to those of the first preferred embodiment can be exhibited in respect of the structure, mounting, and size reduction of each resisting member 22 and the shift operation. Additionally, the shift shock and the impact noise can be further reduced, and the degree of freedom of setting of the rotation resisting force to be imparted by each resisting member 22 can be increased.

While each resisting member 22 is provided for the corresponding transmission gear rotatably mounted on the main shaft 2 in each of the first and second preferred embodiments, additional resisting member or members 22 may be provided between the inner circumference of the third gear 8c rotatably mounted on the counter shaft 3 and the bushing 14 splined to the counter shaft 3 and/or between the inner circumference of the fourth gear 7c rotatably mounted on the counter shaft 3 and the bushing 13 splined to the counter shaft 3 in such a manner that the metal rings 22a are press-fitted with the outer circumferences of the bushings 13 and 14. In this case, the other configuration is the same as that of the first or second preferred embodiment. Also in this case, effects similar to those of the second preferred embodiment can be exhibited.

As still another preferred embodiment of the present invention, the resisting member or members 22 need not be provided on the main shaft 2 as in the first or second preferred embodiments, but the resisting member or members 22 may instead be provided only between the inner circumference of the third gear 8c rotatably mounted on the counter shaft 3 and the bushing 14 and/or between the inner circumference of the fourth gear 7c rotatably mounted on the counter shaft 2 and the bushing 13 in such a manner that the metal rings 22a are press-fitted with the outer circumferences of the bushings 13 and 14. Also in this case, the other configuration is the same as that of the first or second preferred embodiment, and effects similar to those of the first or second preferred embodiment.

Figure 8:
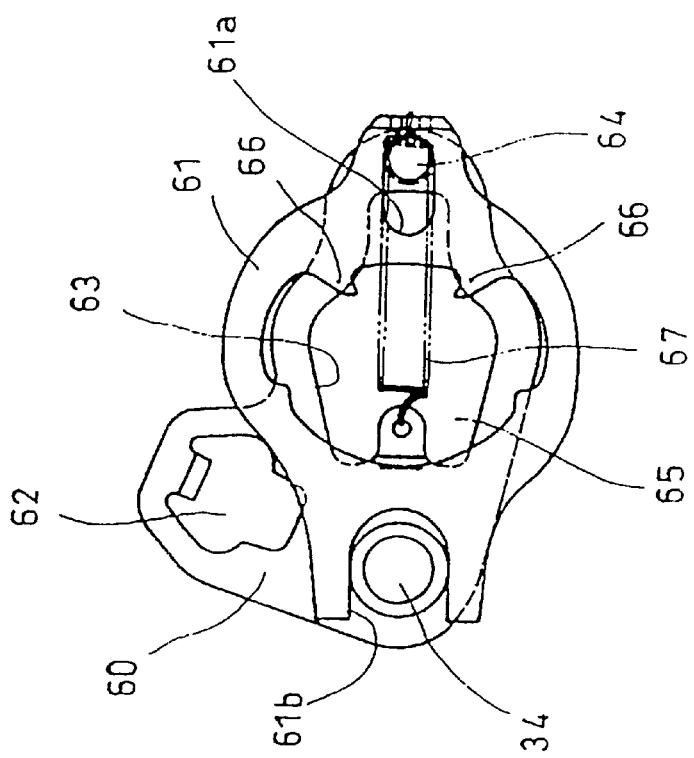
FIG. 8 is an end view of an assembled shifting master arm and gear shift arm different from that shown in FIG. 5.
Figure 9:
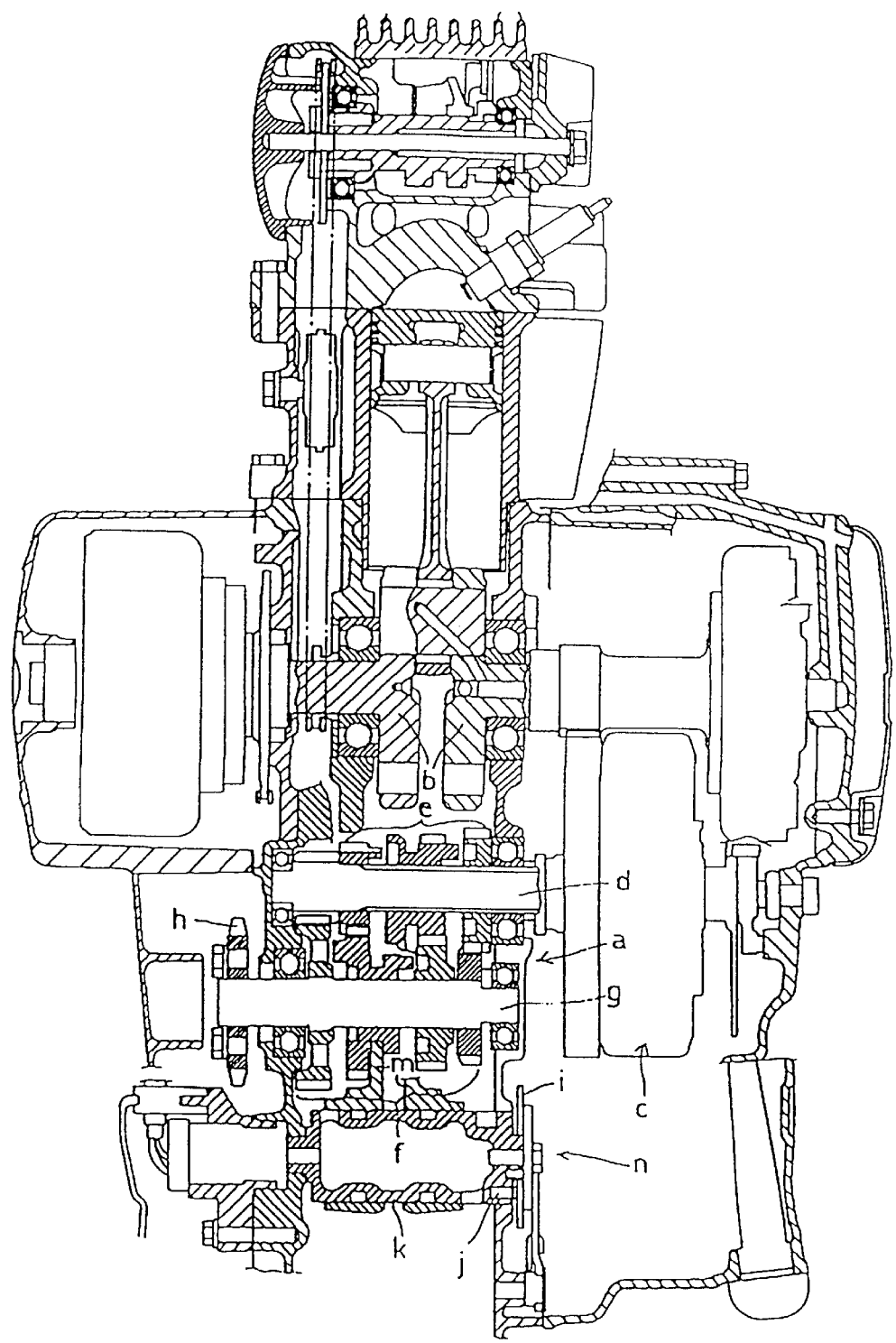
FIG. 9 is a vertical sectional view of a prior art constant mesh transmission.

The shifting master arm 36 and the gear shift arm 37 in each preferred embodiment mentioned above may be replaced by a shifting master arm 60 and a gear shift arm 61 shown in FIG. 8. The shifting master arm 60 is integrally fixed to the gear shift spindle 34, and has an opening 62 for insertion of the pin 42 for restricting the swing range of the shifting master arm 60 and an opening 63 formed at a portion opposed to the shift pins 46 of the shift drum 31. The gear shift arm 61 has an elongated hole 61a, and a guide pin projecting from the shifting master arm 61 is engaged with the elongated hole 61a.

The gear shift arm 61 further has a recess 61b with which the gear shift spindle 34 is engaged. The gear shift arm 61 is reciprocated to slide on the shifting master arm 60. The gear shift arm 61 further has an opening 65 having a size capable of receiving the six shift pins 46. A pair of pawls 66 for engaging the shift pins 46 to rotate the shift drum 31 are formed on the inner circumference of the gear shift arm 61. The pawls 66 have the same function as that of the pawls 47 of the gear shift arm 37 in the first preferred embodiment. A shift arm spring 67 is provided on one side of the shifting master arm 60 as a plate-like member opposite to the gear shift arm 61 (i.e., on the back side of the shifting master arm 60 as viewed in FIG. 8). The shift arm spring 67 has one end engaged with the shifting master arm 60 and the other end engaged with the gear shift arm 61, so that the gear shift arm 61 is normally biased toward the gear shift spindle 34 (leftward as viewed in FIG. 8) by the shift arm spring 67.

Like the shifting master arm 36 and the gear shift arm 37 in the first preferred embodiment, at least one of the sliding surfaces of the two arms 60 and 61 is surface-treated to reduce a coefficient of friction. Accordingly, the gear shift arm 61 can be smoothly reciprocated on the shifting master arm 60 as in the first preferred embodiment, thereby smoothening the shift operation to improve the shift feeling.

While the resisting member 22 in each of the above preferred embodiments is configured by integrating the metal ring 22a and the annular lip 22b of rubber or plastic, the annular lip 22b may be replaced by a plurality of lips fixed to the outer circumference of the metal ring 22a so as to be spaced in the circumferential direction of the metal ring 22a. Further, the resisting member 22 may be formed of only rubber or plastic.

While each resisting member 22 in the preferred embodiments is provided between the inner circumference of the transmission gear 6m and the outer circumference of the main shaft 2 and press-fitted with the outer circumference of the main shaft 2, between the inner circumference of the transmission gear 9m and the outer circumference of the bushing 16 and press-fitted with the outer circumference of the bushing 16, between the inner circumference of the transmission gear 7c and the outer circumference of the bushing 13 and press-fitted with the outer circumference of the bushing 13, or between the inner circumference of the transmission gear 8c and the outer circumference of the bushing 14 and press-fitted with the outer circumference of the bushing 14, each resisting member 22 may be fixed by any other fixing means, or may be fixed to the inner circumference of the corresponding transmission gear.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A constant-mesh transmission for a vehicle comprising:
a first rotatable shaft having a plurality of gears;
a second rotatable shaft having a plurality of gears; and a resisting member operatively connected to at least one of said shafts and one of the plurality of gears associated with said shaft, wherein the resisting member imparts a rotation resisting force to either the shaft or the gear, wherein the resisting member is a substantially annular member comprising a metal ring and a lip, said metal ring being fixed to a rotational portion of said first rotatable shaft or to a first gear of said plurality of gears on the first shaft.

2. The constant-mesh transmission for a vehicle of claim 1, wherein the resisting member is press-fitted to said rotational portion of the first rotatable shaft.

3. A constant-mesh transmission for a vehicle comprising:
a first rotatable shaft having a plurality of gears;
a second rotatable shaft having a plurality of gears; and
a resisting member operatively connected to at least one of said shafts and one of the plurality of gears associated with said at least one of said shafts, wherein the resisting member imparts a rotation resisting force to either the shaft or the gear, wherein said plurality of gears of said first rotatable shaft includes a first gear rotatable relative to said first rotatable shaft, and said plurality of gears of said second rotatable shaft includes a second gear which is constantly meshing with said first gear and mounted on said second rotatable shaft so as to be non-rotatable relative to said second rotatable shaft, wherein said resisting member is provided between a rotational portion of said first rotatable shaft and said first gear, and wherein the second gear of the second shaft is axially slidable on the second shaft and serves as a shifter.

4. The constant-mesh transmission for a vehicle of claim 3, wherein the first shaft is a main shaft for transmitting torque from a crankshaft, and the second shaft is a counter shaft which is operatively connected to a drive sprocket for transmitting torque to the drive sprocket.

5. The constant-mesh transmission for a vehicle of claim 3, wherein the resisting member imparts said rotation resisting force to either said first shaft or said first gear.

6. The constant-mesh transmission for a vehicle of claim 5, wherein the first gear includes a recess, the resisting member being at least partially disposed within said recess.

7. The constant-mesh transmission for a vehicle of claim 3, wherein the resisting member imparts the rotation resisting force to an outer circumference of the rotational portion of the first rotatable shaft, the resisting member exerting the force on an area of the first rotatable shaft which is proximate to an area of mounting of said first gear of the plurality of gears of said first shaft.

8. The constant-mesh transmission for a vehicle of claim 3, wherein the resisting member is an annular member which is disposed between the first gear on the first shaft and the first shaft.

9. The constant-mesh transmission for a vehicle of claim 4, wherein the resisting member is located between one of said plurality of gears of the main shaft and said main shaft.

10. The constant-mesh transmission for a vehicle of claim 9, wherein the resisting member is a substantially annular member, the resisting member being located between a recess in said one of said plurality of gears of the main shaft and the main shaft.

11. The constant-mesh transmission for a vehicle of claim 4, further comprising a second resisting member, the second resisting member is a substantially annular member located between a recess in one of the plurality of gears of the second rotatable shaft and the second shaft.

12. The constant-mesh transmission for a vehicle of claim 3, further comprising a second resisting member which is located between one of said plurality gears of said first rotatable shaft and the first rotatable shaft, the second resisting member being an annular member which imparts a rotation resisting force to one of said gears and said first shaft.

13. The constant-mesh transmission for a vehicle of claim 3, wherein:
the first and second rotatable shafts each have six gears, a third and a fourth gear of the first shaft being integral with one another and being axially slidable along the first shaft; and
a fifth gear of the first shaft is rotatably mounted on the first shaft.

14. The constant-mesh transmission for a vehicle of claim 13, wherein:
a first gear of the second shaft is rotatably mounted on the second shaft;
a fifth gear of the second shaft has interior grooves which are engageable with spline grooves on the second shaft; and
a projection on the fifth gear of the second shaft is adapted to engage a recess of the first gear of the second shaft.

15. The constant-mesh transmission for a vehicle of claim 13, wherein:
a third and a fourth gear of the second shaft are rotatably mounted on the second shaft; and
a sixth gear of the second shaft has internal spline ridges which engage spline grooves on the second shaft, the sixth gear being slidable on the second shaft and non-rotatable with respect to the second shaft.

* * * * *